US009584774B2

(12) United States Patent
Bekiares et al.

(10) Patent No.: US 9,584,774 B2
(45) Date of Patent: Feb. 28, 2017

(54) METHOD AND APPARATUS FOR REMOTELY CONTROLLING AN IMAGE CAPTURE POSITION OF A CAMERA

(75) Inventors: Tyrone D. Bekiares, Chicago, IL (US); Matthew C. Keller, Barrington, IL (US); Steven D. Tine, Buffalo Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1082 days.

(21) Appl. No.: 13/279,911

(22) Filed: Oct. 24, 2011

(65) Prior Publication Data

US 2013/0100306 A1   Apr. 25, 2013

(51) Int. Cl.
H04N 7/18 (2006.01)
G08B 13/196 (2006.01)
H04N 7/14 (2006.01)

(52) U.S. Cl.
CPC ....... *H04N 7/185* (2013.01); *G08B 13/19689* (2013.01); *G08B 13/19621* (2013.01); *H04N 2007/145* (2013.01)

(58) Field of Classification Search
USPC .................................................... 348/211.8
See application file for complete search history.

(56) References Cited

U.S. PATENT DOCUMENTS 7,643,054 B2   1/2010   Griss et al.
7,720,364 B2   5/2010   Scott et al.
2003/0103149 A1*   6/2003   Kinjo et al. ............... 348/231.5
2004/0202443 A1   10/2004   Obrador et al.
2009/0086199 A1*   4/2009   Troy et al. .................... 356/251

FOREIGN PATENT DOCUMENTS

WO   2013062747 A1   5/2013

OTHER PUBLICATIONS

International Search Report and Written Opinion mailed Jan. 28, 2013 in counterpart International Application No. PCT/2012/059307.

* cited by examiner

*Primary Examiner* — Mark T Monk

(57) ABSTRACT

A digital image capture device streams captured images (e.g. low-resolution images) to a remote viewer terminal, along with image identifiers and/or device position information. The remote viewer terminal displays the images for viewing by a remote viewer. The remote viewer provides inputs to a user interface, which indicate a direction of desired movement of the image capture device, and/or that the remote viewer wants new images (e.g. high-resolution images) to be captured at a desired position. The user interface inputs are translated into requests, which are transmitted to the image capture device. The image capture device provides movement prompts that direct a device operator to move the device in a requested direction or toward a requested position. When a position of the device corresponds to a requested image capture position, the image capture device captures one or more new images, and transmits the new images.

13 Claims, 4 Drawing Sheets

METHOD AND APPARATUS FOR REMOTELY CONTROLLING AN IMAGE CAPTURE POSITION OF A CAMERA

FIELD OF THE DISCLOSURE

The present disclosure relates generally to methods and apparatus for controlling movable cameras, and more particularly, to methods and apparatus for remotely controlling an image capture position of a movable camera.

BACKGROUND

Among other features, Next Generation 911 (NG911) systems will enable citizens to stream live video to Public Safety Answer Point (PSAP) operators and dispatchers (referred to collectively as "practitioners," below) from their camera-equipped, cellular telephones or other wireless devices. The handheld nature of these devices, together with their limited optics, makes it impractical to include mechanical or digital pan, tilt, and zoom controls to adjust the camera's field of vision. The lack of such controls makes it impossible for a public safety practitioner to remotely manipulate the camera's field of vision. Instead, only the citizen has the ability to manipulate the camera's field of vision by physically moving the camera at the citizen's discretion.

This may be problematic for several reasons. For example, using the received video, a public safety practitioner located at the PSAP may attempt to interpret conditions at an incident scene being videoed, in order to make injury and/or damage assessments, determine appropriate emergency services to dispatch, and/or provide instructions to the citizen controlling the image capture device. Accordingly, the public safety practitioner logically is in the best position to determine the appropriate field of vision for the intended use of the video, even though the public safety practitioner lacks the ability to manipulate that field of vision. In addition, the handheld nature of camera-equipped, cellular telephones makes the field of vision highly unstable. Accordingly, a stressed or agitated citizen is likely to move the device in a haphazard fashion, which may significantly degrade the usefulness to the public safety practitioner of the received video. In addition, wireless bandwidth constraints may force the video streamed to the PSAP to be of relatively low resolution. The received video quality may be non-optimal for some purposes, such as providing visual evidence in the context of future litigation regarding the incident (e.g. positive identification, characterizing physical evidence that is no longer available, and so on), or remotely diagnosing an injury.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
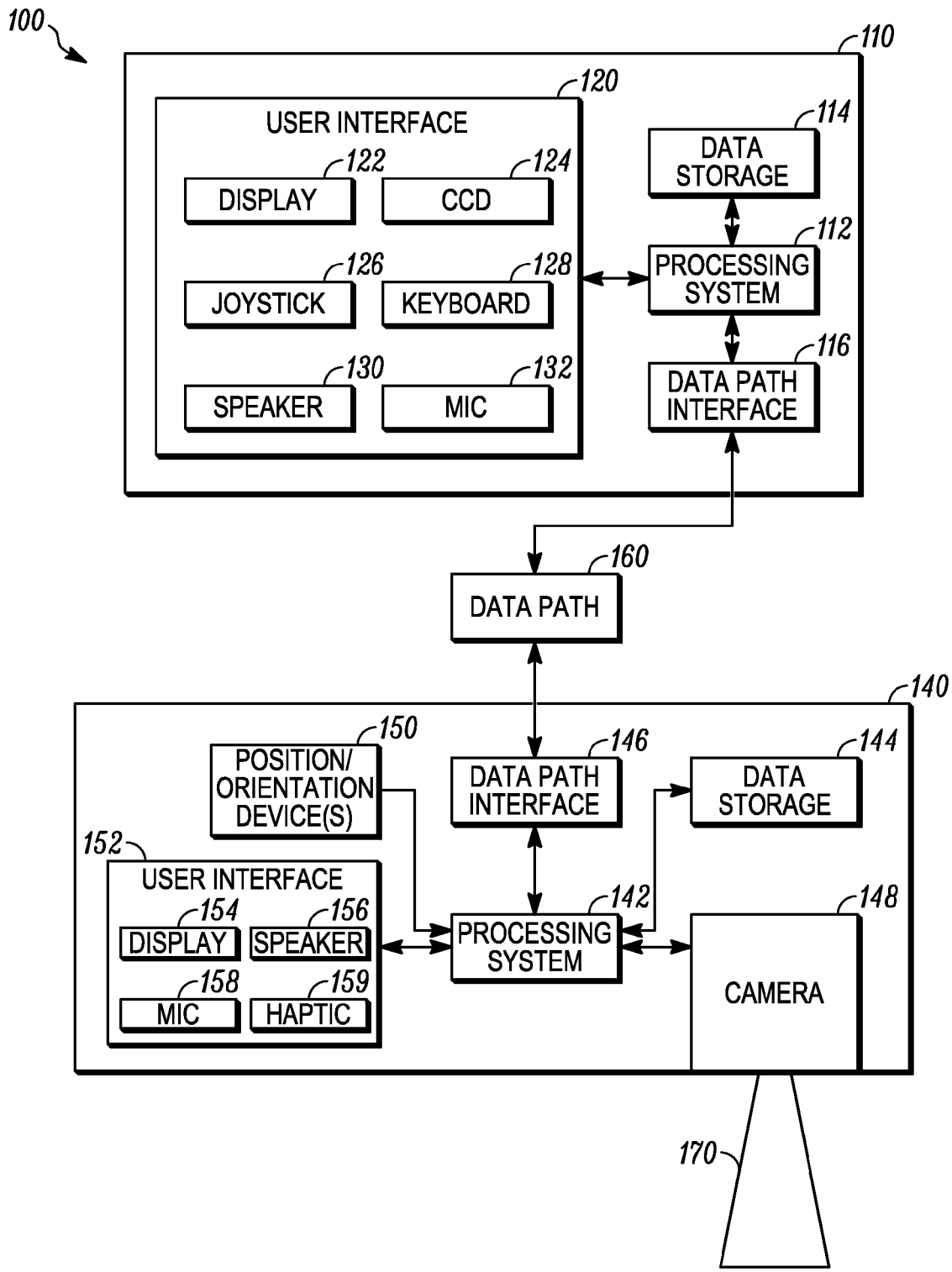
FIG. 1 is a simplified block diagram of a system that includes a remote viewer terminal configured to communicate with an image capture device over a data path, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention enables a remote viewer (e.g. public safety practitioners at a PSAP) to more readily affect the field of vision of a camera-equipped, portable device, and/or to obtain relatively high quality images captured by the device. Various embodiments are disclosed herein of portable image capture devices (e.g. cellular telephones), remote electronic systems (e.g. Public Safety Answer Point (PSAP) terminals) that communicate with the portable devices, and methods implemented on those portable devices and electronic systems in conjunction with capturing and conveying desired images. The below description discusses the various embodiments in the context of PSAP operations. More specifically, examples of systems discussed below include a PSAP terminal that communicates over a data path with a portable image capture device (e.g. a cellular telephone or other portable device). Example scenarios are discussed in which a citizen (or "device operator") physically controls the position and orientation of the device in order to capture video, which is transmitted over the data path to the PSAP terminal (or "remote viewer terminal"). A PSAP practitioner (or "remote viewer") views the video on the PSAP terminal, and using a device operator interface associated with the PSAP terminal, the PSAP practitioner conveys instructions (via the data path) to the portable device. These instructions include instructions that cause the portable device to convey movement prompts to the device operator, in order to encourage the device operator to move the device to a position and orientation in which the camera may capture video in a desired field of vision (i.e. a field of vision desired by the remote viewer). In addition, the instructions may include instructions to capture relatively high-resolution video or images when the camera has been positioned to have the desired field of vision.

Implementation of the various embodiments has certain advantages over other techniques for remotely controlling a camera's field of vision. For example, rather than implementing the various embodiments, a remote viewer may try to direct the device operator via verbal instructions provided over a voice/telephony channel, where the verbal instructions may include instructions such as "pan to the left," "stop moving the camera," and so on. This approach is undesirable because, when the device operator is holding the device in a manner appropriate for capturing video, the device operator cannot keep the device pressed to his or her ear. Although a speakerphone function, theoretically, could be used, the environment in which the device operator is present may have high levels of ambient noise, making it difficult to hear the verbal instructions. In addition, the remote viewer's instructions may be ambiguous (e.g. "go back" may be interpreted in several ways), it may be difficult for a remote viewer verbally to convey a desired re-orientation, the device operator may have a hearing impairment, may not comprehend the language of the remote viewer, or may be confused (e.g. due to the stressfulness of the situation). Accordingly, verbal instructions to move a device that are provided by a remote viewer may be unreliable. As the below discussion will indicate, the various embodiments enable a remote viewer to specify a desired field of vision or an object of interest, and to convey information to the device that enables the device to provide unambiguous movement prompts to the device operator (e.g. prompts to move the device to a position in which the camera's field of vision coincides with the desired field of vision or to a position in which the object of interest falls within the camera's field of vision). In addition, the remote viewer may convey, via the remote viewer terminal, an instruction for the camera automatically to capture relatively high-resolution video or images when the camera has been moved so that the camera's field of vision coincides with the desired field of vision (or when the object of interest is within the camera's field of vision).

It is to be understood that, although an example system is discussed that includes a wireless, image capture device that communicates with a PSAP terminal, the various embodiments may be applicable to other types of systems as well. For example, the various embodiments may be applicable in systems in which search and rescue responders with portable devices (e.g. wired or wireless devices) use the devices to capture video of an incident scene, and stream the video to a remote viewer (e.g. medical personnel or a structural specialist) sitting at a terminal. The various embodiments also may have applicability to remotely controlled mining, exploration, surveillance, manufacturing, and other activities. Accordingly, although a particular example application of the embodiments is discussed herein, the description should not be interpreted as limiting application of the embodiments only to the example application discussed herein.

An embodiment of a method performed by a digital image capture device includes receiving, over a data path, an image capture request from a second device (e.g. an operator console at a PSAP), where the image capture request indicates an image capture position for the image capture device. The image capture device then determines whether a current position of the image capture device corresponds to (e.g. approximately equals) the image capture position. When the current position corresponds to the image capture position, the image capture device captures a new image using the digital camera.

An embodiment of a device (referred to in this paragraph as a "first device") includes a digital camera, a data path interface, and a processing system. The data path interface is configured to receive, over a data path, an image capture request from a second device, where the image capture request is associated with an image capture position for the first device. The processing system is configured to determine whether a current position of the first device corresponds to the image capture position, and when the current position corresponds to the image capture position, to control the digital camera to capture a new image, and to produce new image data based on the new image.

An embodiment of an electronic system includes a display device, a device operator interface, a data path interface, and a processing system. The data path interface is configured to receive, from a remote device, image data and indications of image capture positions associated with the image data. The processing system is configured to cause images to be displayed on the display device, where the images correspond to the image data received from the remote device. The processing system also is configured to receive a device operator input via the device operator interface indicating device operator selection of a selected image of the displayed images, and to transmit an image capture request to the remote device via the data path interface, where the image capture request includes information corresponding to an image capture position for the selected image.

FIG. 1 is a simplified block diagram of a system 100 that includes a remote viewer terminal 110 configured to communicate with an image capture device 140 over a data path 160, in accordance with some embodiments. Data path 160 may include a single data communications network or multiple, interconnected data communications networks through which the remote viewer terminal 110 and the image capture device 140 communicate. For example, when image capture device 140 is configured to communicate over a cellular telephone and remote viewer terminal 110 is a PSAP operator terminal, data path 160 may include a cellular telephone network (which interfaces with device 140) communicatively coupled with a local area network (LAN) (which interfaces with remote viewer terminal 110), along with any additional intervening networks and data path interfaces. Data path 160 also or alternatively may include the internet, a wide area network (WAN), a Wi-Fi network, and any of a number of other types of networks.

According to an embodiment, image capture device 140 and/or remote viewer terminal 110 are configured to communicate wirelessly with data path 160, and accordingly, at least one component of data path 160 provides a wireless communication interface to image capture device 140 and/or remote viewer terminal 110. In alternate embodiments, either or both image capture device 140 and/or remote viewer terminal 110 may communicate over a hardwired communication link with data path 160. In yet another alternate embodiment, remote viewer terminal 110 and image capture device 140 may be directly connected together, in which case data path 160 may not specifically include a data communications network. Either way, data path 160 provides a communication interface between remote viewer terminal 110 and image capture device 140. In a particular embodiment, data path 160 supports the communication of single images and a stream of images, herein referred to as "video," from image capture device 140 to remote viewer terminal 110, and the communication of various other types of information and commands between the remote viewer terminal 110 and the device 140.

As discussed previously, the remote viewer terminal 110 may be, for example, an operator terminal associated with a PSAP, although the remote viewer terminal could be a computer or terminal associated with a different type of system or a computer or terminal having no association with any particular system at all. Either way, a human "remote viewer" (not illustrated) interacts with remote viewer terminal 110 in various ways, which will be described in more detail below.

Remote viewer terminal 110 includes a processing system 112, data storage 114, data path interface 116, and user interface 120, in an embodiment. Data path interface 116 enables the remote viewer terminal 110 to communicate over the data path 160 with the image capture device 140. Data path interface 116 includes apparatus configured to interface with whatever type of data path 160 is implemented in the system 100 (e.g. data path interface 116 may facilitate wired or wireless communication with a network of data path 160, or may facilitate communication with device 140 over a direct connection).

Processing system 112 may include one or more general-purpose or special-purpose processors, which are configured to execute machine readable software instructions that are stored in data storage 114. The machine readable software instructions may correspond to software programs associated with implementing various example embodiments. As will be discussed in more detail below, the software programs include programs that interpret user inputs to various input devices of user interface 120, cause a display 122 to display various images and other information, interface with data storage 114 to store and retrieve data, coordinate the establishment and maintenance of voice and data communication paths with image capture device 140 over data path 160, process data (e.g. images, image identifiers, and so on) received over data path 160 from image capture device 140, and generate data (e.g. image capture requests, movement requests, and so on) to be transmitted over data path 160 to image capture device 140.

Data storage 114 may include random access memory (RAM), read only memory (ROM), compact disks, hard disks, and/or other data storage devices. Data storage 114 is configured to store software instructions (as mentioned above) and additional data associated with the performance of the various embodiments. For example, data storage 114 is configured to store data representing captured images, which have been received from image capture device 140. In addition, data storage 114 is configured to store image identifiers and/or device position information that was received from image capture device 140 in conjunction with the image data.

User interface 120 includes various input and output devices that enable the remote viewer to interact with remote viewer terminal 110. For example, user interface 120 may include one or more of each of the following types of input and output devices: display 122, cursor control device (CCD) 124, joystick 126, keyboard 128, speaker 130, and microphone (MIC) 132. As will be described in more detail below, the various input devices (e.g. display 122 (when it is a touchscreen), charge-coupled device (CCD) 124, joystick 126, keyboard 128, and microphone 132) enable the remote viewer to select currently displayed or previously displayed images or objects, and to indicate various requested movements of the image capture device 140. For example, the input devices could be used to indicate relative movement requests (e.g. pan left, move forward, and so on), semi-absolute movement requests (e.g. move north, and so on), and/or absolute movement requests (e.g. move to a particular geographical location). Image or object selections and/or movement requests may be translated (by processing system 112 or the device 140) into information that enables the image capture device 140 to provide movement prompts to the operator of the device 140, as will be described in more detail later.

Under the control of processing system 112 (or a display controller associated therewith), display 122 is configured to display images (e.g. still images and video) conveyed in image data from camera equipped device 140. In addition, display 122 may be utilized to display various other types of information (e.g. textual information associated with a particular incident response, select lists (e.g. lists of movement instructions), selectable icons, and so on). Display 122 may be a touchscreen or non-touchscreen type of display. In the former case, display 122 is considered both an input and an output device, and the remote viewer may select various displayed images and/or objects by touching corresponding portions of the touchscreen. In the latter case, display 122 is considered an output-only device.

CCD 124 may include any one or more devices that enable the remote viewer to select a displayed image or object, such as a mouse, touchpad, button, and so on. In addition, in an embodiment in which display 122 is a touchscreen type of display, those aspects of display 122 that provide the touchscreen capabilities may be considered to be portions of CCD 124. As will be described in more detail later, CCD 124 enables the remote viewer to select an image and/or an object within an image, where that selection may be used to determine a desired position for the image capture device 140. Consistent with the image or object selections specified via CCD 124, display 122 or some other input device, processing system 112 generates and transmits movement requests and/or image capture requests to the image capture device 140, as will be explained in more detail later. As will also be described in detail later, upon receiving such movement requests and/or image capture requests, the image capture device 140 provides prompts to the operator of the device 140 to move the device in various ways.

Joystick 126 may include one or multiple sticks, which pivot on a base, and a processing component that interprets and reports stick angle and/or stick direction information to processing system 112. Joystick 126 also may include one or more additional buttons or controls, which enable the remote viewer to change the joystick mode of operation, indicate a selection, and/or indicate a desired change in an optical magnification level of the image capture device 140. For example, as will be described in more detail later, a remote viewer may want the system 100 to instruct an operator (not illustrated) of the image capture device 140 to change an orientation and/or geographical location of the device 140, so that the camera 148 of the device 140 may capture images in a different field of vision from its current field of vision (e.g. field of vision 170). In addition, a remote viewer may want the system 100 to cause the camera 148 of the image capture device 140 automatically to increase or decrease an optical magnification level in order to zoom in or zoom out, respectively, while the image capture device 140 is capturing images. These desired changes may be indicated through manipulations of joystick 126, in an embodiment, or through manipulations of other components of user interface 120, in other embodiments.

According to an embodiment, joystick 126 may include a first stick that enables the remote viewer to indicate that the remote viewer wants the device operator to change the orientation of the device 140 in space (e.g. pivot left, pivot right, pivot up, pivot down) or to stop changing the device orientation (e.g. by releasing the first stick), and a second stick that enables the remote viewer to indicate that the remote viewer wants the device operator to change the geographical location of the device (e.g. move left, move right, move forward, move backward, move up, move down)

or to stop moving (e.g. by releasing the second stick). Alternatively, joystick 126 may include a single stick and a mode select button which, when pressed, changes the manner in which joystick 126 interprets inputs provided via the stick. In a first mode, the inputs may be interpreted to indicate desired changes in orientation, and in a second mode, the inputs may be interpreted to indicate desired changes in geographical location. In alternate embodiments, orientation and geographical location change requests may be stipulated by the remote viewer by manipulating keys on keyboard 128 (e.g. arrow keys), selecting (via CCD 124) orientation and/or directional indicators displayed on display 122, or typing (via keyboard 128) movement commands. Either way, as will be described in detail later, processing system 112 generates and transmits movement requests to the image capture device 140, which are consistent with the inputs to joystick 126 (e.g. the stick angle and/or stick direction information produced by joystick 126). As will also be described in detail later, upon receiving such movement requests, the image capture device 140 provides prompts to the operator of the device 140 to perform the desired movements. When a movement request corresponds to an optical magnification level change, the image capture device 140 automatically (i.e. without interaction with the device operator) may adjust the optical magnification level according to the request.

Keyboard 128 may be a standard QWERTY keyboard, or a specialized keyboard that is configured to enable a remote viewer to input information via various keys. For example, via keyboard 128, a user may provide textual movement instructions (e.g. relative, semi-absolute, and/or absolute movement instructions), and/or information that may be converted into movement instructions (e.g. geographical coordinates, and so on). In addition, the remote viewer may be able to indicate selection of an image or object via keyboard 128.

Speaker 130 and microphone 132 enable the remote viewer to conduct verbal communications with the operator of image capture device 140 (e.g. over a voice channel between the remote viewer terminal 110 and the device 140). In addition, microphone 132 may enable the remote viewer to provide verbal instructions that are converted (e.g. by a speech-to-text application executed by processing system 112) into image or object selection indications, movement request indications, and so on.

Although FIG. 1 illustrates the remote viewer terminal 110 as a stand-alone device that communicates directly with the image capture device 140 via the data path 160, it is to be understood that the remote viewer terminal 110 may form a portion of a larger system (e.g. a PSAP system). Such a system may include multiple remote viewer terminals, routing equipment, data and communication server(s), and so on. In addition, although FIG. 1 depicts processing system 112 and data storage 114 as being incorporated in remote viewer terminal 110, it is to be understood that some functions associated with the various embodiments could be performed outside the remote viewer terminal 110 (e.g. in a distributed processing environment in which some functions are performed by a server (not illustrated) that is communicatively coupled with the remote viewer terminal 110). In addition, some software programs and/or data may be stored in data storage devices that are distinct from the remote viewer terminal 110.

Image capture device 140 may be any one of various types of portable devices, including but not limited to cellular telephones, two-way radios, portable computers (e.g. laptop and tablet computers), video equipment (e.g. video cameras), and so on. Image capture device 140 includes a processing system 142, data storage 144, data path interface 146, camera 148, one or more position/orientation devices 150, and a user interface 152, including a display 154, in an embodiment. Data path interface 146 enables the image capture device 140 to communicate over the data path 160 with the remote viewer terminal 110. Data path interface 146 includes apparatus configured to interface with whatever type of data path 160 is implemented in the system 100 (e.g. data path interface 146 may facilitate wired or wireless communication with a network of data path 160, or may facilitate communication with remote viewer terminal 110 over a direct connection).

Processing system 142 may include one or more general-purpose or special-purpose processors, which are configured to execute machine readable software instructions that are stored in data storage 144. The machine readable software instructions may correspond to software programs associated with implementing various example embodiments. As will be discussed in more detail below, the software programs include programs that cause camera 148 to capture images (e.g. low-resolution and high-resolution still images and video), cause display 154 to display the captured images (e.g. in a viewfinder mode), determine and store device orientation, location, and/or motion (e.g. in conjunction with capturing images or prompting the operator to move the device 140), interface with data storage 144 to store and retrieve data (e.g. image data, image identifiers, and/or device position information), cause display 154, speaker 156, haptic device 159 or other output devices to provide visual, audio, and/or haptic movement prompts to the device operator, coordinate the establishment and maintenance of voice and data communication paths with remote viewer terminal 110 over data path 160, process information (e.g. image capture requests, movement requests, and so on) received over data path 160 from remote viewer terminal 110, compute movement paths based on current device orientation/location information and the movement or image capture requests, and coordinate transmission of image data and image identifiers (or device position information) over data path 160 to remote viewer terminal 110.

Data storage 144 may include random access memory (RAM), read only memory (ROM), compact disks, hard disks, and/or other data storage devices. Data storage 144 is configured to store software instructions (as mentioned above) and additional data associated with the performance of the various embodiments. For example, data storage 144 is configured to store data representing images that have been captured by camera 148, image identifiers, and device position information that was generated based on inputs from position/orientation devices 150 in conjunction with capturing the images.

Camera 148 is a digital camera configured to capture images within its field of vision 170, and to convert those images into image data. As used herein, the term "field of vision" means the angular extent of the observable world that can be detected by camera 148 at any given time. Generally, the field of vision 170 is centered about a direction that is perpendicular to a lens (not illustrated) of camera 148. The orientation, geographical location, and optical magnification level of image capture device 140, at any given time, define its field of vision 170.

Under control of processing system 142, camera 148 may be controlled to capture still images and/or to capture video (e.g. continuous streams of still images), and to convert the captured images into image data. In an embodiment, camera 148 and/or processing system 142 compresses the image data prior to storing the image data in data storage 144, although the image data may be stored in an un-compressed format, as well. "Image data," as used herein, refers to data, in compressed or un-compressed formats, that defines one or more captured images.

Camera 148 is capable of capturing both relatively low-resolution images (e.g. images represented using hundreds of kilopixels (e.g. a two dimensional array of 100-1000 pixels by 100-1000 pixels, or some other number)) and relatively high-resolution images (e.g. images represented using a number of megapixels (e.g. a two dimensional array of 1000-10,000 pixels by 1000-10,000 pixels, or some other number)), at various times. The term "resolution," as used herein, is defined to be the total number of pixels in a two dimensional array of pixels. As will be described in more detail later, camera 148 may be controlled to capture relatively low-resolution images in a normal operational mode, and may be controlled to capture a relatively high-resolution image in response to an image capture request from the remote viewer terminal 110. As will be described later, and according to an embodiment, camera 148 also includes zoom capabilities (i.e. variable optical magnification of the field of vision 170), which may be remotely controlled via requests received from remote viewer terminal 110. The term "optical magnification" is used herein to denote any adjustment to the magnification of the captured field of vision 170, whether instrumented through manipulation of the lens, physically moving the image capture device 140 toward or away from an object (e.g. along an axis around which the field of vision 170 is centered), and/or through subsequent digital processing of the captured images (e.g. through digital zoom, which selects subsets of pixels from a captured image).

Position/orientation devices 150 produce outputs that enable processing system 142 to determine the position (e.g. geographical location and/or orientation) of device 140. For example, position/orientation devices 150 may include any one or more of a Global Positioning System (GPS) interface, one or more accelerometers, a gyroscope, and/or a compass. GPS interface outputs enable the processing system 142 to determine an absolute geographical position of the device 140 (e.g. latitude, longitude, and altitude). Accelerometer and/or gyroscope outputs enable the processing system 142 to determine the orientation and movement (e.g. translation and rotation) of the device 140 with respect to an Earth-fixed reference frame (e.g. indicating translation and rotation (e.g. roll, pitch, yaw) of the device 140 with respect to the Earth's surface). Compass outputs enable the processing system 142 to determine the directional orientation (e.g. north, south, east, west) of the device 140 with respect to the Earth-fixed reference frame. As will be explained in more detail later, the outputs from the position/orientation devices 150 enable the processing system 142 to associate device position and/or orientation information with image data, to compute movement paths along which the device operator is directed to move the device 140, and to determine when the device 140 is moved in a manner that deviates from a computed movement path.

User interface 152 includes various input and output devices that enable the device operator to interact with image capture device 140. For example, user interface 152 includes display 154, speaker 156, microphone (MIC) 158, haptic device 159 (e.g. a vibrational motor), and a keypad and/or keyboard (not illustrated). As will be described in more detail below, the various output devices (e.g. display 154, speaker 156, and/or haptic device 159) may be controlled to provide prompts to the operator of the image capture device 140 to move the device 140 in a particular way (e.g. to change the orientation of the device, to move the device to a different geographical location, and/or to stop moving the device). Display 154 may be a touchscreen or non-touchscreen type of display.

Under the control of processing system 142 (or a display controller associated therewith), display 154 is configured to display images (e.g. still images and video) captured by camera 148 within its field of vision 170. For example, the images may be displayed in a viewfinder mode (i.e. an operational mode in which images captured by camera 148 are displayed in near real-time on the display 154). Images displayed in a viewfinder mode may be referred to as "real-time" images, herein. In addition, display 154 may be utilized to display visual movement prompts (e.g. arrows, text, and so on) that appear to overlay the displayed images. The movement prompts are displayed in response to movement requests and/or image capture requests from the remote viewer terminal 110.

Figure 2:
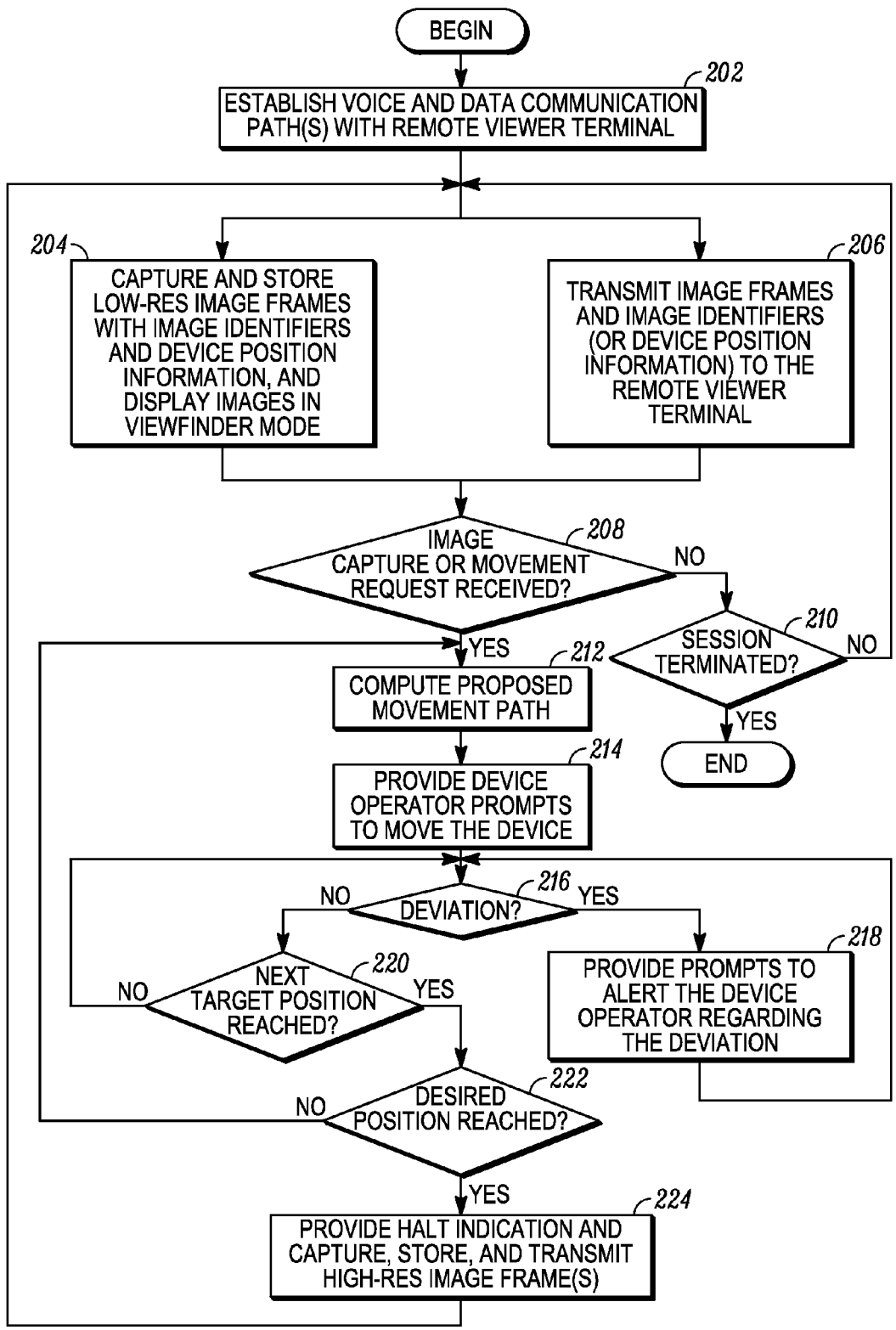
FIG. 2 is a flowchart of a method for an image capture device to provide movement prompts to a device operator in response to movement requests and/or image capture requests received from a remote viewer terminal, and to capture images at desired image capture positions, in accordance with some embodiments.
Figure 3:
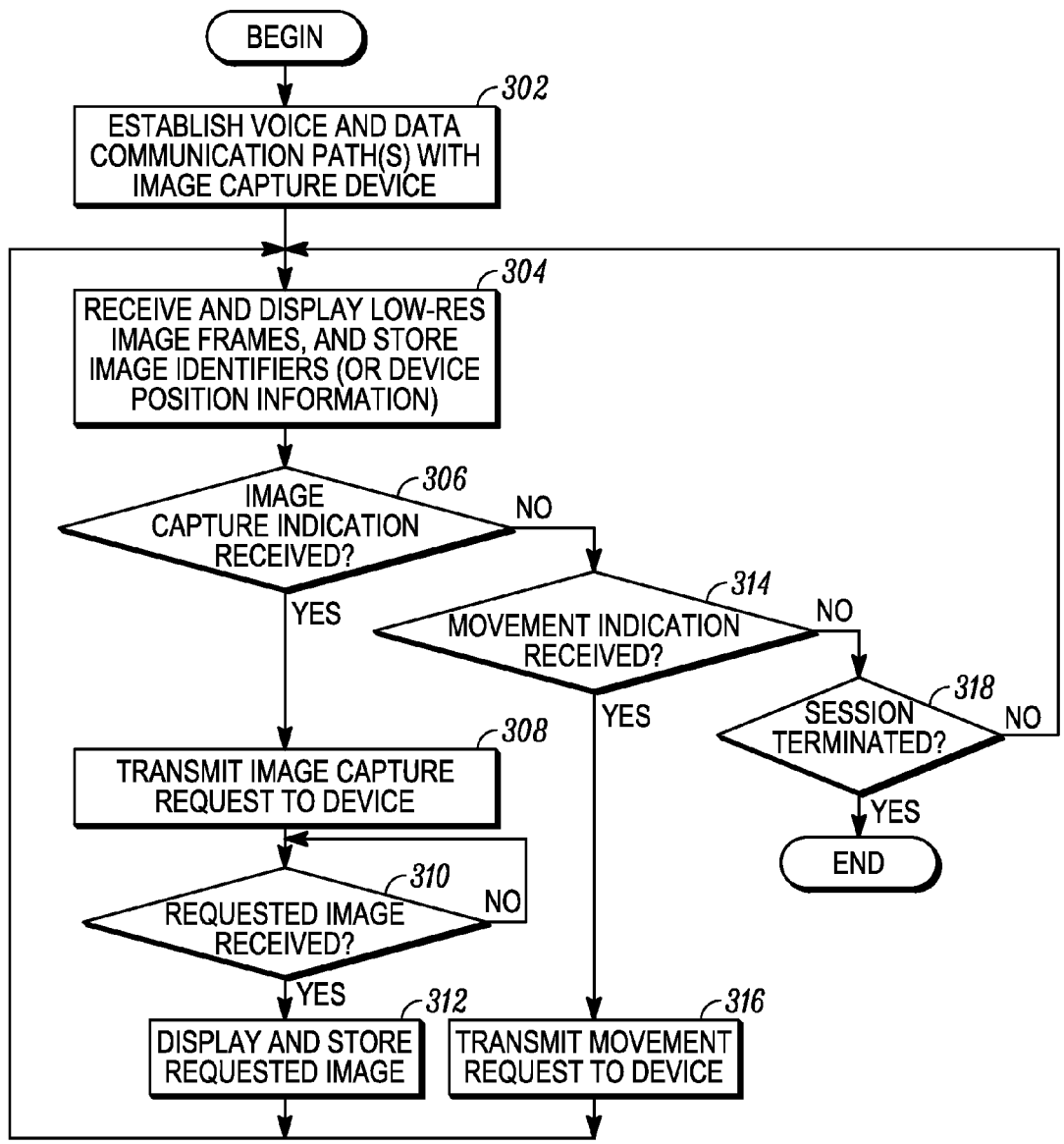
FIG. 3 is a flowchart of a method for a remote viewer terminal to affect an image capture device's movement and image capture processes, in accordance with some embodiments.

Processes performed according to various embodiments will now be described in conjunction with FIGS. 2 and 3. FIG. 2 depicts various processes performed by an image capture device (e.g. device 140, FIG. 1), and FIG. 3 depicts various processes performed by a remote viewer terminal (e.g. remote viewer terminal 110, FIG. 1). Because the various processes performed by the image capture device and the remote viewer terminal depend on communications between them, FIGS. 2 and 3 should be viewed together (e.g. side-by-side) for increased understanding. More particularly, FIG. 2 is a flowchart of a method for an image capture device to provide movement prompts to a device operator in response to movement requests and/or image capture requests received from a remote viewer terminal, and to capture images at desired image capture positions, in accordance with some embodiments. FIG. 3 is a flowchart of a method for a remote viewer terminal to affect an image capture device's movement and image capture processes, in accordance with some embodiments.

With reference to FIGS. 2 and 3, the method begins, in blocks 202, 302 (FIGS. 2, 3) when image capture device (e.g. device 140, FIG. 1) and remote viewer terminal (e.g. terminal 110, FIG. 1) establish voice and data communication paths over a data connection (e.g. data path 160, FIG. 1) between them. The voice and data communication paths may be established simultaneously or in a sequence. For example, in the context of a device operator initiating a 911 call using the image capture device and the call being answered at the remote viewer terminal, a voice communication path may first be established using various protocols and procedures that are appropriate for a voice communication path (e.g. protocols specific to NG911, the Session Initiation Protocol (SIP), or another protocol). According to an embodiment, during establishment of the voice communication path, the image capture device provides capabilities information to the remote viewer terminal. For example, the capabilities information may indicate: 1) that the image capture device has a digital camera (e.g. camera 148, FIG. 1); 2) capabilities of the camera (e.g. zoom capabilities, an indication of whether the camera can take low-resolution and high-resolution images, or both, and so on); 3) the types of position/orientation devices with which the image capture device is equipped (e.g. whether the device is equipped with GPS, accelerometers, a gyroscope, and/or a compass); and 4) that the image capture device has an appropriate software application that enables embodiments of the inventive subject matter, discussed herein, to be carried out. Although it is important for the device to be equipped with the appropriate software application and at least some of the above-mentioned types of position/orientation devices in order to be capable of implementing the various embodiments, the device may not have all possible types of position/orientation devices that enable all types of device positions, movements, and/or orientations to be determined, as will be discussed later. In such cases, the remote viewer terminal and/or the image capture device may implement a subset of the system capabilities.

Information relating to the communication session may be displayed at the remote viewer terminal (e.g. on display 122, FIG. 1). For example, when the image capture device is a cellular telephone communicating over a cellular network, the displayed information may include a telephone number of the image capture device, a name of the device owner (e.g. obtained from accessible records), and a location of the device (e.g. a location specified in GPS data sent by the device, a location derived through triangulation, and so on). In addition, the displayed information may indicate some or all of the device capabilities exchanged during call setup (e.g. that the device has a camera, the types of position/orientation devices on the device, the software application, and so on).

Once the voice communication path is established, the remote viewer (via microphone 132 and speaker 130) and the device operator (via user interface 152) may begin speaking with each other. For example, the remote viewer may ask the device operator the purpose of the call. Based on the device operator's response, and when the remote viewer has determined that the image capture device is equipped with a camera, appropriate software, and at least some appropriate position/orientation devices, the remote viewer may ask the device operator to capture one or more images (e.g. a still image or video) of an incident scene at which the device operator is located. Alternatively, the device operator may, on his or her own, decide to capture and transmit (e.g. stream) images of the incident scene to the remote viewer terminal.

Before or in conjunction with the device operator activating the camera (e.g. camera 148, FIG. 1), a bi-directional data communication path may be established between the image capture device and the remote viewer terminal for the purpose of conveying images (e.g. low-resolution and high-resolution images singly or in the context of a stream of images), image identifiers, and/or device position information from the image capture device to the remote viewer terminal, and communicating movement requests and image capture requests from the remote viewer terminal to the image capture device. The data communication path may be established using NG911, SIP, or another protocol, for example. Once the data communication path is established, an optimal capabilities negotiation (e.g. as described above) may commence. A video stream from the image capture device to the remote viewer terminal is then established over the data communication path, and the images (both low-resolution and high-resolution), image identifiers, device position information, movement requests, and image capture requests subsequently may be transmitted over the data communication path (e.g. using an internet protocol, such as the real time protocol (RTP)). In addition, the device operator may communicate verbally with the remote viewer over the voice communication path.

Typically, in conjunction with capturing images, the device operator has removed the device from his or her ear, and is holding the device in a manner that the camera is pointed toward the incident scene. This enables the device operator to view the images on the device's display screen (e.g. display 154, FIG. 1) in a viewfinder mode. According to an embodiment, when the camera is activated, the device may operate (automatically or at the behest of the device operator) in a speakerphone mode, to enable the device operator and the remote viewer terminal to continue to communicate verbally.

In block 204 (FIG. 2), the image capture device begins capturing, storing, displaying, and transmitting (e.g. streaming) images to the remote viewer terminal over the data path (e.g. data path 160, FIG. 1). According to an embodiment, images captured in conjunction with a video stream are captured initially at a relatively low resolution. Alternatively, images may be captured at a relatively high resolution, initially. Either way, for each image captured by the camera (e.g. camera 148, FIG. 1), the image capture device displays (e.g. on display 154, FIG. 1) the image in viewfinder mode, and stores (e.g. in data storage 144, FIG. 1) image data that defines each image. The image data may be compressed prior to storage or transmission. For example, the image capture device may use an industry standard compression technology (e.g. H264, JPEG, or other technologies) to compress the image data.

During the process of capturing the images, and according to an embodiment, the image capture device associates an image identifier with each captured image. The image identifier provides a means by which a particular image may be uniquely identified from the plurality of images that may be captured during a communication session. According to an embodiment, the image capture device also determines, for each captured image, the position (e.g. geographical location and/or orientation) of the image capture device at the time that the image was captured, and the optical magnification level of the device's camera (e.g. camera 148, FIG. 1) at a time when the image was captured. Alternatively, the device position and/or optical magnification level may be determined less frequently than in conjunction with each captured image. Either way, the position determination may be made based on information provided by the device's position/orientation devices (e.g. position/orientation devices 150, FIG. 1). For example, when the device is GPS-equipped, the device may define the device's geographical location, at least in part, by the device's latitude, longitude, and altitude, as provided by the GPS equipment. When the device includes one or more accelerometers and/or a gyroscope, the device may define the device's orientation, at least in part, by angular offsets from a fixed reference frame, as indicated by accelerometer outputs. When the device includes a compass, the device may define the device's orientation, at least in part, by the directional orientation of the device, as indicated by compass outputs.

According to an embodiment, along with the actual image data, the image capture device also maintains (in data storage 144) a table in which image identifiers are correlated with the position information that was determined in conjunction with capturing the images. In other words, for each image captured by the image capture device, the image capture device maintains information indicating the position of the device at the time that the image was captured. The optical magnification level also may be correlated with the image identifiers. Because the field of vision (e.g. field of vision 170, FIG. 1) of the camera is essentially fixed with respect to the body of the device, the position information and the optical magnification information associated with each image indicates the field of vision of the camera at the time when the image was captured.

In block 206 (FIG. 2), which is performed in parallel with block 204, the image capture device transmits the images to the remote viewer terminal via the data path, in an embodiment. When the data path (e.g. data path 160, FIG. 1) supports packet-based communications, the image capture device formats the image data into packets, which the device transmits over the data path. According to an embodiment, the packets also convey the image identifiers for each image that is transmitted. In an alternate embodiment, the packets may convey the position information and/or the optical magnification level information determined in conjunction with capturing the images, in addition to or in lieu of the image identifiers. For example, in an embodiment, the image data and the image identifiers (or the device position information and/or optical magnification level) are communicated using real-time transport protocol (RTP) packets, which include an IP header, a datagram protocol header, an RTP header, and a data field. For each image, the image data is conveyed in the data field, and the image identifier (or the device position information and/or optical magnification level) is conveyed in an RTP header extension (or elsewhere in the packet). In alternate embodiments, the compressed image data and the image identifiers (or the device position information and/or optical magnification level) could be communicated using differently-formatted packets, or using a non-packet based communication protocol.

The image capture device continues to capture and store images (block 204) and transmit the image data (block 206) in the above-described manner until an image capture or movement request is received (block 208, described later) or the communication session is terminated (block 210), at which point the method ends.

With reference to FIG. 3, additional processes performed by the remote viewer terminal will now be described. In block 304, the remote viewer terminal receives the image data and the image identifiers (and/or device position information) via the data path. The remote viewer terminal stores the image data, along with the corresponding image identifiers. In addition or alternatively, when device position and/or optical magnification level information is received, the remote viewer terminal may store the device position and/or optical magnification level information along with the image data. The image data, image identifiers, position information, and/or optical magnification level information may be stored in local data storage (e.g. data storage 114, FIG. 1) or on a separate server or other storage device (not illustrated).

As the image data is being received, the remote viewer terminal also displays (e.g. on display 122) images corresponding to the received image data. Accordingly, the remote viewer may observe the streaming video captured by the image capture device. The streaming video appears to be contemporaneous with the image capture, although in actuality, the streaming video is delayed from the corresponding capture due to the delays associated with digitizing, compressing, transmitting, de-compressing, and displaying the images.

According to an embodiment, as the remote viewer observes the received images, the remote viewer may, via the user interface, indicate that the remote viewer wants the image capture device to capture one or more new (e.g. high-resolution) images while the camera (e.g. camera 148, FIG. 1) has a particular field of vision (e.g. field of vision 170, FIG. 1). A field of vision of the camera that is indicated by a remote viewer, as described below, is referred to herein as a "desired field of vision" (i.e. it is desired by the remote viewer). For example, according to an embodiment, the remote viewer may provide an indication of a desired field of vision by using a CCD (e.g. CCD 124, FIG. 1) or a touchscreen (if one is implemented) to select a displayed image (or an object within a displayed image) that corresponds to a desired field of vision.

According to an embodiment, the remote viewer terminal displays, in a primary video window, real-time images corresponding to the image data as it is received and processed by the remote viewer terminal. The remote viewer may provide an input (e.g. a mouse click when the displayed cursor overlies an icon corresponding to image capture) to select a current image being displayed in the primary video window. The input indicates that the remote viewer wants the image capture device to capture one or more additional (e.g. high-resolution) images while the camera lens is pointed at the scene presented in the selected image. Alternatively, the remote viewer may be able to access and select a previously displayed image (e.g. to rewind to a previous time in the displayed image stream or to select a thumbnail image of a previously-displayed scene) corresponding to a field of vision that is different from the field of vision of the image displayed in the primary video window (i.e. a previously displayed scene corresponds to the desired field of vision). Similar to providing an input requesting high-resolution image capture based on an image displayed in the primary window, the remote viewer may provide an input (e.g. by selecting an image capture icon) to request high-resolution image capture by selecting a previously displayed image.

In either case, when an image capture indication is received, as indicated in block 306, the remote viewer terminal determines the image identifier for the selected image, and transmits the image identifier to the image capture device in the context of an image capture request in block 308. In an alternate embodiment in which the remote viewer terminal has received and stored device position information and/or optical magnification level in conjunction with received image data, the remote viewer terminal may identify the position information and/or optical magnification level corresponding to the selected image, and may transmit the position information and/or optical magnification level to the device in the context of the image capture request. In still another embodiment, as indicated previously, the remote viewer may select (e.g. using CCD 124 or a touchscreen) a particular object within a displayed image. In such a case, the remote viewer terminal may estimate a device position that would be appropriate to capture images of the particular object, and may transmit the estimated device position to the device in the context of the image capture request.

Either way, the remote viewer indications received through the user interface are converted (e.g. by processing system 112, FIG. 1) into image capture requests, and the image capture requests are transmitted to the image capture device via the data path (e.g. data path 170, FIG. 1). According to an embodiment, the remote viewer terminal conveys image capture requests (and movement requests, described later) using a protocol that is built upon the Real Time Control Protocol (RTCP), although the image capture requests (and/or the movement requests) could be conveyed using a different protocol, as well. The manner in which the image capture device responds to a received image capture request will be described in more detail later.

A remote viewer may provide indications other than image capture indications, as well. For example, the remote viewer may indicate that the viewer simply wants the device operator to move the camera's field of vision (e.g. field of vision 170, FIG. 1) in a particular direction without any particular image capture directive, and/or that the viewer wants the camera (e.g. camera 148, FIG. 1) of the device to change (i.e. increase or decrease) its optical magnification level. A change in an optical magnification level may appear to the remote viewer to be forward (e.g. when the magnification level is increased) or backward (i.e. when the magnification level is decreased) movements of the device. Accordingly, requested changes in optical magnification level are still referred to herein as "desired movements." The above-described indications of desired movements are referred to as "non-specific" movement indications, in that the remote viewer is not specifying a particular, desired field of vision. In such a case, the remote viewer may provide indications of how the remote viewer would like the device operator to move the image capture device in order to change the field of vision that is currently reflected in the images displayed on the remote viewer terminal, or indications of how the remote viewer would like the device to change its optical magnification level.

For example, the remote viewer may want the device operator to pan the field of vision to the left, right, up, or down, and may provide such indications via manipulations of a joystick (e.g. joystick 126, FIG. 1) or some other input device. The force on the joystick may indicate the speed or magnitude of the desired movement, and these indications may be conveyed to the image capture device along with the geo-directional indications. In addition or alternatively, the remote viewer may want the device operator to change the geographical location of the device (e.g. to walk forward, backward, left, right, or to a different geographical location), or to change the optical magnification level (e.g. which appears to correspond to the device operator walking forward or backward). These desires also may be conveyed by the remote viewer via manipulations of a joystick or some other input device, or by the remote viewer specifying (via user interface 120) a specific direction (e.g. north, south, east, west), geographical position (e.g. in latitude/longitude, street names, landmarks, and so on), or optical magnification level.

Alternatively, the remote viewer may want to indicate that the device operator should move the camera to capture images within a specific, desired field of vision or to capture images while the image capture device is at a specific location and/or in a specific orientation (all of which are referred to as "specific" movement indications). In order to provide an indication that the device operator should move the camera to capture images within a specific, desired field of vision, the remote viewer may provide an input (e.g. a mouse click when a displayed cursor overlies an image or an object in an image) to select an image that corresponds to the desired field of vision. For example, the remote viewer may select the current image being displayed in the primary video window (i.e. the most recently displayed image). Such a selection indicates that the remote viewer wants the device operator to keep the camera lens pointed at the scene presented in the selected image (i.e. the displayed scene corresponds to the remote viewer's desired field of vision). Alternatively, the remote viewer may select a previously displayed image, as discussed previously.

When either a non-specific or a specific movement indication is received through the user interface, as indicated in block 314, the movement indication is converted (e.g. by processing system 112, FIG. 1) into a movement request, and the remote viewer terminal transmits the movement request to the image capture device via the data path (e.g. data path 170, FIG. 1), in block 316. A non-specific movement request may include, for example, information indicating a desired direction of movement of the device and/or the device operator (e.g. pan left, pan right, pan up, pan down, move forward, move backward, move left, move right). In contrast, a specific movement request may specify an image identifier (e.g. the image identifier for the selected image), a device position (e.g. device position information associated with a selected image, if it is known to the remote viewer terminal), information defining a specific geographical location (e.g. in latitude/longitude/altitude or location name), and/or information defining a specific orientation (e.g. compass direction and/or angular offsets with respect to a fixed reference frame).

With reference again to FIG. 2, when the image capture device has received an image capture request or a movement request from the remote viewer terminal, as indicated by block 208, the remote viewer terminal may compute a proposed movement path, in block 212, although computation of a movement path may not be performed for some types of requests. Essentially, a proposed movement path includes a sequence of one or more device positions (including geographical locations and/or device orientations) between a current device position and a device position that is indicated in the image capture request or a specific movement request. Accordingly, in conjunction with computing a proposed movement path, the image capture device determines a current device position (e.g. a current geographical location and/or device orientation, as indicated by outputs from position/orientation devices 150, FIG. 1) and a desired device position (e.g. based on information in the image capture request or the movement request). In the case of an image capture request, the desired device position corresponds to an "image capture position" at which the image capture device automatically may capture an image. An image capture position may be defined using at least one position definition parameter selected from a group consisting of a device orientation, a device geographical location, and an optical magnification level, in an embodiment.

For example, either an image capture request or a specific movement request may include an image identifier, as discussed previously. In such a case, to determine a proposed movement path, the image capture device (or more specifically, processing system 142, FIG. 1) uses the image identifier from the request as a key to retrieve device position information that was previously stored by the device (e.g. in data storage 144, FIG. 1) when the image corresponding to the image identifier was initially captured. The image identifier in the image capture request or the specific movement request also corresponds to the image identifier that was transmitted by the device to the remote viewer terminal with the corresponding image data. The retrieved device position information corresponding to the image identifier is considered to be the desired device position. Alternatively, as discussed previously, the image capture request or the specific movement request may, instead of or in addition to the image identifier, specifically include the desired device position (i.e. the device position information, when known at the remote viewer terminal, which is associated with an image that was selected by the remote viewer).

Once the desired device position is determined, the image capture device computes a movement path between the current device position and the desired device position, in an embodiment. In an alternate embodiment, the remote viewer terminal determines the current device position (e.g. based on the most recently received images or based on telemetry from the image capture device), and computes the movement path. In such a case, the remote viewer terminal may transmit a sequence of movement requests to the image capture device, where the sequence of movement requests conveys instructions to move the device incrementally along the computed movement path.

Either way, the movement path includes a sequence of one or more target positions, with the last target position in the sequence corresponding to the desired device position. Each target position may specify a geographical location and/or a device orientation. When the desired device position is relatively close to the current device position, the movement path may be defined by a single target position that is the same as the desired device position. A desired device position may be considered relatively close to the current device position, for example, when it would be possible to direct the device user to reposition the image capture device to the desired device position using a single movement prompt, as will be described below. Conversely, when the desired device position is relatively far from the current device position, the movement path may be defined by multiple target positions, where the last target position in the sequence corresponds to the desired device position, and other target positions correspond to intermediate device positions between the current device position and the desired device position. A desired device position may be considered relatively far from the current device position, for example, when it would be difficult to direct the device user to reposition the image capture device to the desired device position using a single movement prompt, and it would be easier and more comprehensible to the device user to direct the device user to the desired device position using a sequence of multiple movement prompts, as will be described below.

Because a non-specific movement request includes only information indicating a desired direction of movement of the device and/or the device operator (e.g. pan left, pan right, pan up, pan down, move forward, move backward, move left, move right) or a desired change in optical magnification level, and does not indicate a desired device position, the step of determining a movement path may be bypassed for non-specific movement requests.

Once a proposed movement path has been computed (or if one is not needed, as is the case for a non-specific movement request), the image capture device either provides prompts to move the device ("movement prompts") to the device operator, in block 214, or automatically adjusts an operational parameter of the device (e.g. optical magnification level). According to an embodiment, each movement prompt provides an indication to the device operator of a direction to move the device. When a proposed movement path has been computed, the direction corresponds to a vector between the current device position and the next target position in the sequence of target positions that define the proposed movement path. Alternatively, for a non-specific movement request that corresponds with a request for the device operator to move the device, the direction indicated by the movement prompt corresponds to the direction indicated in the non-specific movement request.

As mentioned previously, a remote viewer may indicate that the remote viewer wants the device to change its optical magnification level in order to produce the appearance that the device operator is moving the device forward or backward. Such indications are conveyed in non-specific movement requests, and the device automatically changes its optical magnification level in response to such requests.

In other cases, the image capture device may automatically change its optical magnification level as part of its progress along a movement path. More specifically, movement along a portion of the movement path may be simulated using the variable optical magnification capabilities of the camera (e.g. camera 148, FIG. 1). For example, when a portion of a movement path corresponds to moving the image capture device in a forward direction, that movement may be simulated by automatically increasing an optical magnification level of the camera (e.g. by "zooming in"), assuming that the magnification level is not at a maximum already. Similarly, when a portion of a movement path corresponds to moving the image capture device in a backwards direction, that movement may be simulated by automatically decreasing the optical magnification level of the camera (e.g. by "zooming out"), assuming that the magnification level is not at a minimum already. Accordingly, in an embodiment, certain portions of the movement path may automatically be executed by controlling the optical magnification level of the camera. At such times, the image capture device may either provide no movement prompt to the device operator, may provide a movement prompt that instructs the device operator to hold the device still, or may provide a movement prompt that is consistent with the magnification level change. In the latter case, for example, when the magnification level is being increased, a movement prompt may direct the device operator to move forward, and when the magnification level is being decreased, the movement prompt may direct the device operator to move backwards.

Figure 4:
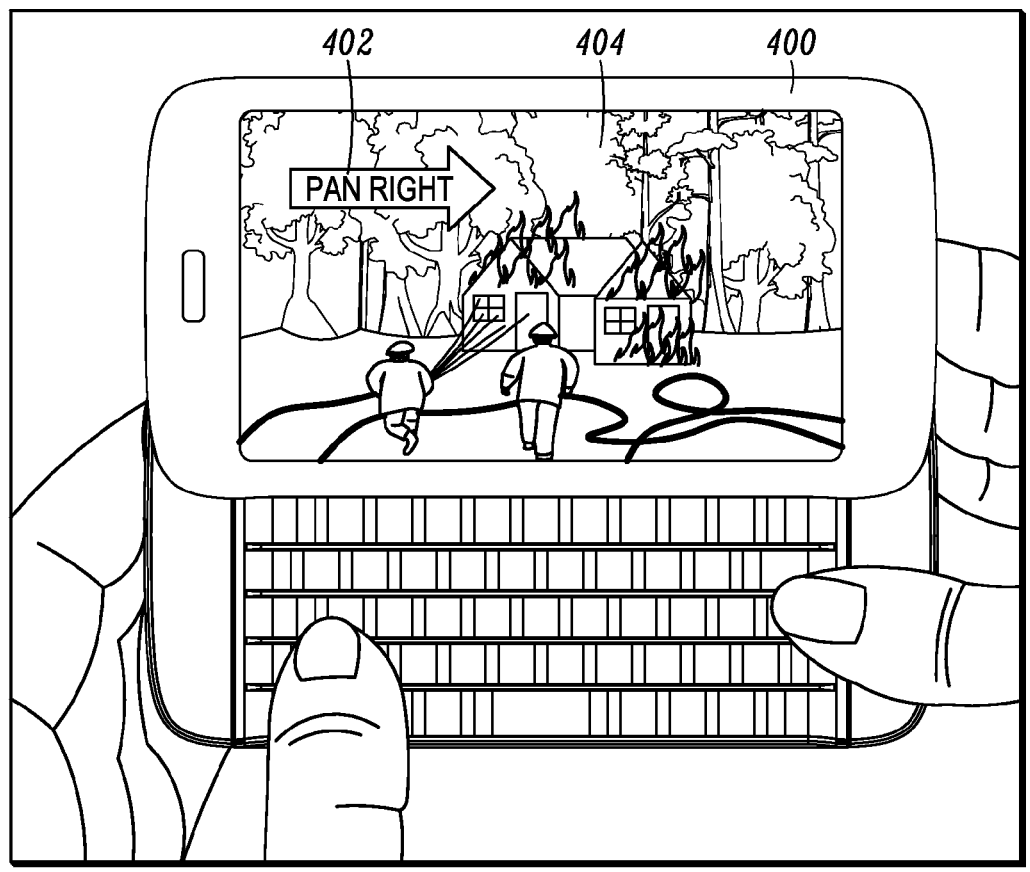
FIG. 4 depicts an example of an image capture device upon which a movement prompt is displayed overlying an image that has been captured and displayed on the display screen, in accordance with some embodiments.

When they are provided, movement prompts may be provided in any of a number of forms. For example, a movement prompt may include a directional indicator displayed in a manner that it appears to overlay the images being displayed on the device in viewfinder mode. For example, FIG. 4 depicts an example of an image capture device 400 upon which a movement prompt 402 is displayed overlying an image 404 that has been captured and displayed on the display screen, in accordance with some embodiments. The movement prompt 402, in the example, includes an arrow that indicates a direction in which the device operator should move the device, and text ("PAN RIGHT") that gives further clarification to the movement directive.

In alternate embodiments, a movement prompt may include an audio prompt (e.g. a voice, tone, or other audible prompt produced by speaker 156, FIG. 1). For example, in conjunction with a displayed arrow, the image capture device may output an audio signal that says "pan right." Alternatively, a movement prompt may include some haptic feedback (e.g. vibration produced by haptic device 159) either to indicate a direction or draw the attention of the device operator to a displayed prompt.

Although FIG. 4 depicts a movement prompt in the form of an arrow pointing to the right and a "PAN RIGHT" directive, those of skill in the art would understand that a displayed arrow may point in any direction of desired movement, and may include a variety of corresponding directives. For example, rather than a "PAN" directive, a movement prompt may instruct the device operator to walk in a particular direction (e.g. "forward," "backward," "left," "right," "north," "south," and so on). Thus, where a panning-type of movement request is intended to encourage the device operator to change the orientation of the device, a translation-type of movement request is intended to encourage the device operator to change the geographical location of the device.

Referring again to FIG. 2, once a movement prompt has been provided, the image capture device monitors the direction in which the device is moved, and determines, in block 216, whether the actual device movement substantially deviates from the direction indicated by the movement prompt (e.g. due to the device operator moving the device in a different direction from the direction indicated by the movement prompt). A deviation also may include the device operator failing to move the device in the indicated direction quickly enough.

As mentioned above, each movement prompt may correspond to a vector between a current device position and a next target position in the sequence of target positions that define the proposed movement path. This vector is referred to herein as an "ideal movement vector." As used herein, a "substantial deviation" from the ideal movement vector or from the direction indicated by a movement prompt means that either: 1) a direction in which the device is currently being moved (e.g. as indicated by accelerometer, gyroscope, or other outputs from the position/orientation devices 150, FIG. 1) is greater than a pre-defined angular distance (e.g. 10 degrees, or some other value) from the ideal movement vector in any direction, or from the direction indicated in a non-specific movement request; 2) a rate at which the device is currently being moved is below a pre-defined threshold (e.g. the device operator is not moving the device toward the next target position or in the indicated direction quickly enough); or 3) a distance of the device from any point along the ideal movement vector or the indicated direction exceeds a pre-defined distance threshold (e.g. a meter, or some other distance).

When a determination has been made that the device is deviating from the movement path or the indicated direction, the image capture device may provide one or more additional prompts to the device operator regarding the deviation, in block 218. For example, the image capture device may provide haptic feedback (e.g. vibration by haptic device 159, FIG. 1) or an additional audio prompt (e.g. voice, a tone, or another audible signal produced by speaker 156, FIG. 1), and/or may alter the display characteristics of a currently displayed movement prompt (e.g. cause the prompt to change color, enlarge, move, or flash). These deviation prompts may continue to be provided until the deviation is cured. In the case of non-specific movement requests, which merely indicate a desired direction of movement, the image capture device continues to provide the movement prompt and to verify that the image capture device is being moved in the indicated direction until a pre-defined period of time has elapsed, at which time the method returns to blocks 204, 206.

For image capture requests and specific movement requests, when there has not been a determination that the device is being moved in a manner that deviates from the movement plan (block 216), a determination may be made whether the current device position corresponds to the next target position in the sequence that defines the movement path, in block 220. The current device position may be considered to "correspond to" the next target position when the current device position equals the next target position, with some degree of allowable error. For example, allowable errors in a geographical location may be defined in terms of a pre-defined distance (e.g. within one meter, or some other distance) from a latitude, longitude, and/or elevation. Allowable errors in orientation may be defined in terms of a pre-defined angular distance (e.g. within 10 degrees or some other value). According to an embodiment, the image capture device continues to monitor for deviations, in block 216, until the next target position has been reached.

When the next target position has been reached, a determination is made in block 222 whether the target position that has been reached is the desired device position (e.g. the device position that corresponds to the image identifier conveyed in the image capture or movement request, or the device position specified in the image capture or movement request). If the target position that has been reached is not the desired device position, the movement path may be re-computed, in block 212, and a new movement prompt may be provided, in block 214, to encourage the device operator to move the device toward the next target position in the sequence. Re-computing the movement path may enable the device operator to move the device to a desired device position in a more efficient manner. Although re-computations of the movement path are shown to occur at particular times in the flowchart of FIG. 2 (e.g. after the device has reached a next target position), the movement path could be re-computed based on other events (e.g. each time the accelerometer detects a significant movement of the device). In an alternate embodiment, once a movement path is computed, it may not be re-computed.

Ultimately, when the device has been moved to the desired device position, the image capture device may provide a "halt" indication, in block 224. For example, the image capture device may display a prompt (e.g. a stop sign with a "HOLD STILL" indicator) that indicates to the device operator that he or she should keep the device's camera pointed in the current direction (e.g. the direction that corresponds to the desired field of vision of the camera). A halt indication also may take the form of an audio prompt (e.g. produced by speaker 156, FIG. 1), haptic feedback (e.g. vibration produced by haptic device 159, FIG. 1), and so on.

When the request was an image capture request, the image capture device automatically may capture, store, and transmit a new image (or series of new images) to the remote viewer terminal. According to an embodiment, the camera may capture the new image at a relatively high-resolution, when compared with the other images that the device had been capturing and streaming to the remote viewer terminal. In an alternate embodiment, the resolution may remain unchanged for the new image. Either way, once the image capture request has been satisfied (i.e. by transmitting the newly-captured image) or the movement request has been satisfied (i.e. by moving the device to the desired device position), the image capture device may return to capturing and transmitting images (e.g. relatively low-resolution images) in the normal manner (e.g. blocks 204, 206), and the method may iterate as shown until the session is terminated, as determined in block 210.

Referring again to FIG. 3, after the remote viewer terminal has transmitted an image capture request, in block 308, the remote viewer terminal waits, as indicated by block 310, to receive the requested image (i.e. an image that has been captured when the image capture device is in the desired device position indicated in the image capture request). While the remote viewer terminal is waiting to receive the requested image, the remote viewer terminal may continue to receive and display the relatively low-resolution images that are received from the image capture device. Once the requested image has been received from the image capture device, in block 312, the remote viewer terminal may display (e.g. in a new window on display 122, FIG. 1) and store (e.g. in data storage 114, FIG. 1) the newly-received image. As discussed previously, the requested image may have relatively higher resolution than the other images streamed by the image capture device to the remote viewer terminal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g. comprising a processor) to perform a method as described and claimed herein. Examples of such computer-readable storage mediums include, but are not limited to, a hard disk, a CD-ROM, an optical storage device, a magnetic storage device, a ROM, a programmable read only memory (PROM), an erasable programmable read only memory (EPROM), an electrically erasable programmable read only memory (EEPROM) and a flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by a first device that includes a digital camera, the method comprising:
    capturing, by the digital camera, an image;
    determining, by the first device, device position data associated with the image;
    storing, by the first device, the device position data in association with a unique image identifier;
    receiving, over a data path, an image capture request from a second device, wherein the image capture request includes the unique image identifier;
    in response to receiving the image capture request, retrieving, by the first device and based on the unique image identifier, the device position data;
    determining, by the first device, an image capture position of the first device based on the retrieved device position data; and
    when a current position of the first device corresponds to the determined image capture position, capturing a new image using the digital camera to produce new image data.

2. The method of claim 1, further comprising:
    transmitting the new image data to the second device.

3. The method of claim 1, wherein the image capture position is defined using at least one position definition parameter selected from a group consisting of a device orientation, a device geographical location, and an optical magnification level.

4. The method of claim 1, further comprising, prior to receiving the image capture request:
    transmitting, by the first device to the second device, the unique image identifier with the device position data.

5. The method of claim 4, wherein:
    capturing the first image comprises capturing the first image at a relatively low resolution; and
    capturing the new image comprises capturing the new image at a relatively high resolution.

6. The method of claim 1, further comprising:
    computing a proposed movement path between a current device position and the image capture position; and
    providing movement prompts to direct an operator of the first device to move the first device along the proposed movement path to the image capture position.

7. The method of claim 6, wherein:
the first device further comprises a display;
the first device displays real-time images captured by the digital camera; and
the movement prompts include directional indicators displayed with the real-time images.

8. The method of claim 6, further comprising:
determining whether there is a substantial deviation between the current device position and the proposed movement path; and
when there is the substantial deviation, providing additional movement prompts to alert the operator regarding the substantial deviation.

9. A first device comprising:
a digital camera configured to capture an image;
a processing system configured to determine device position data associated with the image;
a data storage configured to store the device position data in association with a unique image identifier;
a data path interface configured to receive, over a data path, an image capture request from a second device, wherein the image capture request includes the unique image identifier; and
wherein the processing system further is configured to, in response to receiving the image capture request, retrieve the position data based on the unique image identifier, determine an image capture position of the first device based on the retrieved device position data, and when a current position of the first device corresponds to the image capture position, control the digital camera to capture a new image and to produce new image data based on the new image.

10. The first device of claim 9, wherein the processing system is further configured to compute a proposed movement path between the current position of the first device and the image capture position, and to provide movement prompts to direct a device operator of the first device to move the first device along the proposed movement path to the image capture position.

11. The first device of claim 10, further comprising:
a display configured to display real-time images captured by the digital camera, wherein the movement prompts include directional indicators displayed with the real-time images.

12. The first device of claim 9, wherein:
the processing system is further configured to transmit to the second device, via the data path interface, the unique image identifier with the device position data.

13. The first device of claim 9, wherein the first device is a cellular telephone.

* * * * *